April 22, 1952    H. J. McINTOSH    2,593,780
DUMP RAKE

Filed July 9, 1948    3 Sheets-Sheet 1

Inventor
Harold J. McIntosh

By Clarence A. O'Brien
and Harvey B. Jacobson
Attorneys

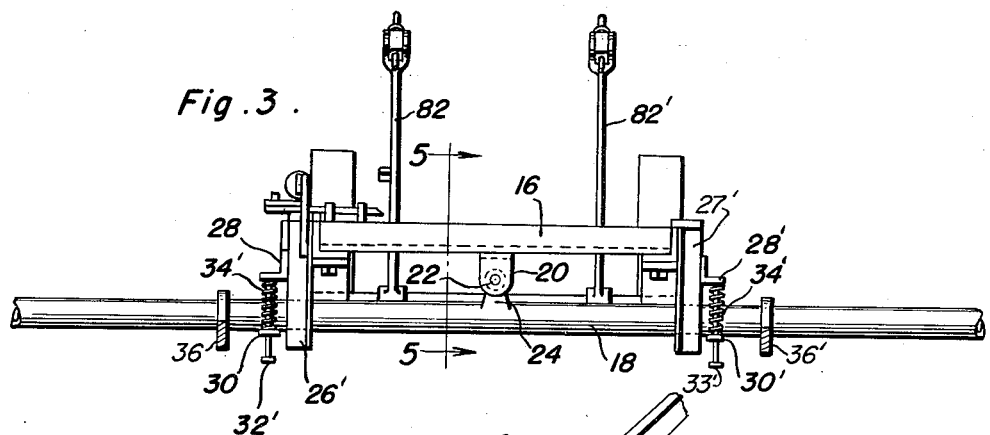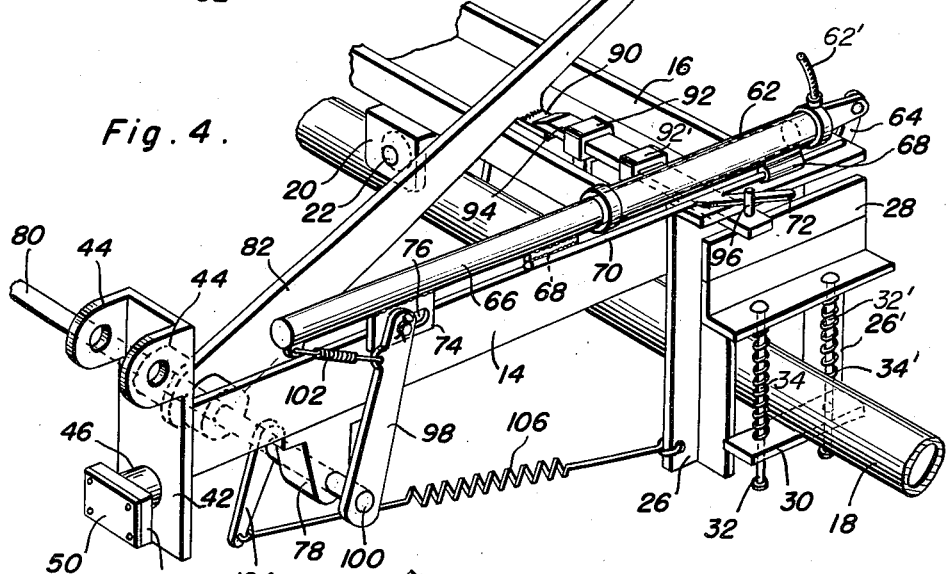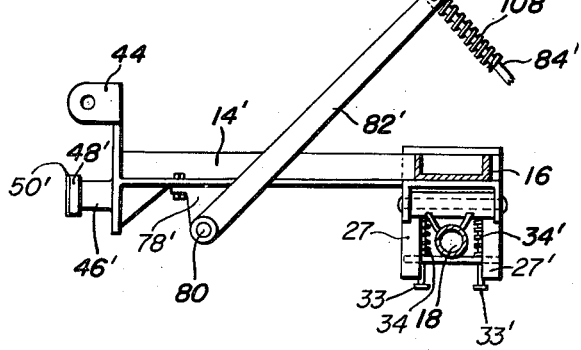

April 22, 1952     H. J. McINTOSH     2,593,780
DUMP RAKE

Filed July 9, 1948     3 Sheets-Sheet 3

Inventor

Harold J. McIntosh

By *Clarence A. O'Brien and Harvey B. Jacobson*
Attorneys

Patented Apr. 22, 1952

2,593,780

UNITED STATES PATENT OFFICE 2,593,780

DUMP RAKE

Harold J. McIntosh, Pender, Nebr., assignor to Automatic Equipment Manufacturing Company, Pender, Nebr., a corporation of Nebraska Application July 9, 1948, Serial No. 37,791

6 Claims. (Cl. 56—27)

1

This invention relates in general to power actuated rakes and more particularly to a hydraulically operated raking device.

The primary object of this invention is to provide a raking device whereby the raking teeth may be hydraulically lifted when it is desired to dump the hay or other material being raked or may be locked in raking position, to comply with the desires of the operator.

Yet another object of this invention is to provide a method of mounting a rake to the prime mover in such a way that the prime mover can go through ditches or over uneven ground and the raking teeth can maintain contact with the surface being raked.

A still further object of this invention is to provide a novel raking device which is so designed that the entire raking device may be compacted into a relatively small space during the transportation of the device, and which can be readily and easily extended into the proper raking position when desired.

A further object of this invention is to provide a novel raking device retaining means for restricting and cushioning the tilting movement of the rake supporting frame when raking ground of uneven contour.

A still further object of this invention is to provide a raking device for attachment to a prime mover such as a tractor wherein a side hill as well as level ground may be raked simultaneously.

These, together with various ancillary objects and features of the invention which will later become apparent as the following description proceeds, are attained by the device, a preferred embodiment of which has been illustrated by way of example only in the accompanying drawings, wherein:

Figure 3 is a vertical sectional view taken substantially in the plane of section line 3—3 of Figure 2;

Figure 4 is an enlarged perspective view of the hydraulic mechanism for raising and lowering the rake teeth;

Figure 5 is a sectional view taken substantially in the plane of section line 5—5 of Figure 3;

Specific reference is now made to the drawings. In the several views in the accompanying drawings and in the following specification reference characters indicate corresponding elements throughout.

Figures 1, 2:
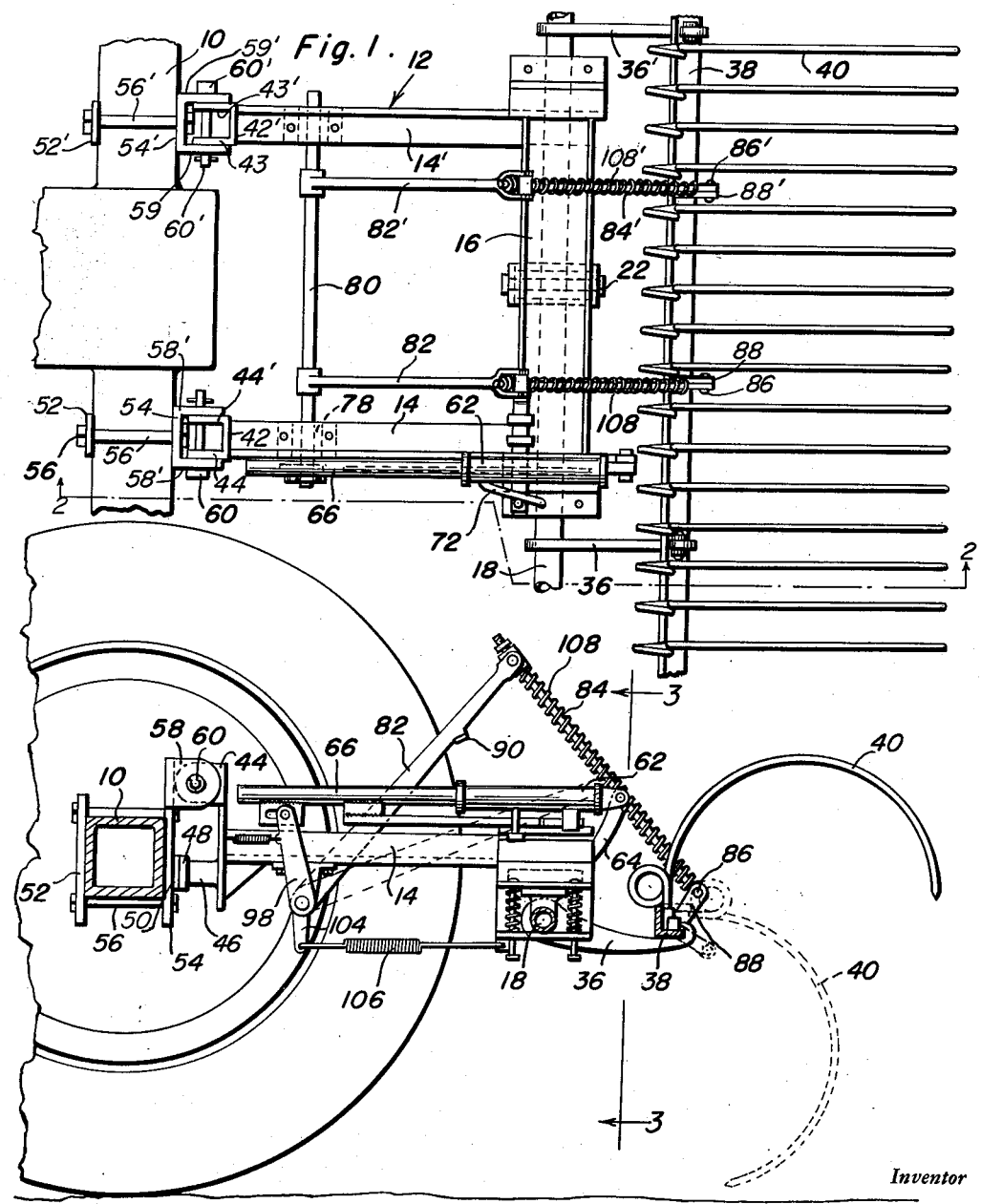
Figure 1 is a top plan view of the raking device attached to the rear axle of a tractor and in raking position.
Figure 2 is a longitudinal sectional view of the device taken on the line 2—2 of Figure 1.

Generally indicated at 10 is the rear axle of a tractor upon which is mounted a carriage 12 which supports the raking device of the instant invention. The carriage consists of a pair of spaced longitudinally extending side members 14, 14' to the rear ends of which are further secured a transversely extending member 16, preferably in the form of a channel as shown in Figure 4. Pivotally supported on the transverse member 16 of the carriage is a main beam 18. The pivotal connection between the main beam 18 and the carriage member 16 consists of generally U-shaped lugs 20 depending from the member 16 which lugs are apertured to receive a pivot pin 22 which engageably receives an apertured lug 24 upstanding from the main beam 18. Thus, the main beam 18 is horizontally pivoted about the pivot pin 22 with relationship to the carriage member 16.

As shown more clearly in Figures 3 and 4, a means is provided for restricting and cushioning the tilting movement of the main beam 18 with relationship to the carriage member 16. This means consists of pairs of spaced parallel arms 26, 26', 27, 27' depending from the side members 14, 14' in the form of angle irons which are positioned about the main beam 18. L-shaped bracket plates 28, 28' are rigidly secured to the tops of the pairs of arms 26, 26', 27, 27' while to the main beam 18 is rigidly secured, as by welding, a pair of plates 30, 30' which are freely movable with the main beam 18 alongside the depending arms 26, 26', 27, 27'. Extending through the plates 28 and 30 on both sides of the main beam 18 is a pair of bolts 32, 32' about which and intermediate the plates 28 and 30 are positioned coil springs 34, 34'. A similar pair of bolts, shown in Figure 5 and designated 33, 33' extend through the plates 28', 30' and on which are similarly positioned coil springs 34, 34'. It will readily be seen that this entire assembly constitutes a form of a shock absorber and when the main beam 18 is tilted laterally in one direction the springs of one of the shock absorbers will be compressed while the springs of another shock absorber on the other end of the carriage will be extended. Of course, the distance between the plates 28 and 30 on the one hand and 28', 30' on the other hand limits or restricts the tilting movement of the main beam 18 on the carriage.

Pivotally secured to the main beam 18 by means of appropriate brackets 36, 36' is a transversely extending tool bar 38 on which is suitably mounted a plurality of spaced conventional rake blades 40.

The forward end of the side members 14, 14' of the carriage are provided with integral upstanding lugs 42, 42' each of which is provided at its top edge with a pair of spaced parallel apertured arms designated 44, 44' on plate 42, and 43, 43' on plate 42' while to the bottom of the lugs 42, 42' are secured leg portions 46, 36' carrying bumpers 48, 48' upon which can be removably secured shims 50, 50'. Secured about the rear axle 10 of the tractor is a pair of clamps comprising back plate 52, 52' and front plate 54, 54' interconnected by means of conventional bolts 56, 56'. The top of the plates 54, 54' are further each provided with a pair of spaced apertured lugs designated 58, 58' on plate 54, and 59, 59' on plate 54' which engageably receive therebetween the ears 44, 44' and 43, 43' on lugs 42, 42'. An appropriate pivot pin 60 holds the ears 44, 44' in pivotal relationship to the lugs 58, 58' and a similar pivot pin 60' similarly holds the ears 43, 43' in like relationship to the lugs 59, 59' so that the carriage 12 may pivot vertically. Thus, by simply interposing a number of shims 50, 50' between the bumpers 48, 48' and the plates 54, 54' the carriage may be pivotally secured upon the rear axle of the tractor in any desired elevated position above the surface of the ground to be raked.

Attention is now directed particularly to Figures 1, 4 and 5 for a description of the novel hydraulically controlled rake raising and lowering means. Generally indicated at 62 is a conventional hydraulic cylinder the rear of which is secured to the carriage by means of a link 64. The cylinder 62, of course, may be supported upon the carriage member 16 by any additional means and is suitably connected by a hydraulic line 62' to a pressure source, not shown. Slidable in the cylinder 62 is a piston rod 66 to which is secured parallel therewith by means of links 68 a cam rod 70 which carries adjacent its rear end a rearwardly inclined cam member 72 and at its forward end a lug 74 which is in turn provided with a longitudinal slot 76. Depending from the side carriage members 14, 14' are bosses 78, 78' through which extends a transverse shaft 80 which is rotatable in said bosses 78, 78'.

Secured intermediate the ends of the shaft 80 is a pair of upwardly and rearwardly inclined raising arms 82, 82' which are of course rotatable with the shaft 80. It will be seen from Figure 1, that a plurality of such raising arms may be provided, each arm being actuated by the piston rod 66. For the purposes of clarity only one hydraulic control means will be described, it being understood that the other hydraulic control means function in a like manner.

At their upper ends, the raising arms 82, 82' are pivotally secured to downwardly and rearwardly inclined connecting rods 84, 84' the free ends of which are pivotally secured as at 86, 86' to arms 88, 88' rigidly attached to or integral with the tool bar 38. Adjacent the upper end of the raising arm 82 is a laterally extending arm or keeper 90.

Slidable in brackets 92, 92' supported on the carriage member 16 is a latch 94 the forward end of which engages or disengages the keeper 90, as will be explained hereinafter, while the rear end of the latch carries an upstanding lug 96.

A link member 98 is provided which is secured as at 100 to the rotatable shaft 80, the upper end of which is in slidable and pivotal engagement with the lug 74 via the slot 76. Interposed between the end of the piston rod 66 and the edge of the link 98 adjacent its upper end is a coil spring 102. Secured to the rotatable shaft 80 adjacent the boss 78 is another link 104. A coil spring 106 is interposed between the depending member 26 and the bottom of the link 104.

In practical operation the hydraulic control means functions in the following manner. As the piston rod 66 is actuated to move to the left on Figure 4, the cam 72 will abut the lug 96, whereupon the latch 94 will be disengaged from the keeper 90 on the raising arm 82 thus freeing the latter. As the piston rod moves a further short distance to the left on Figure 4, the link 98 will rotate the shaft 80 in a counter-clockwise direction, whereupon the raising arm 82, 82' will be tilted upwardly thus urging the tool bar 38 upwardly and pivoting the tool bar and associated rake blades 40 on the main beam 18 via the links 36, 36'. Spring 106 is a tension spring and springs 108, 108' are compression springs. Thus when the shaft 80 is rotated counter-clockwise, the tension of the spring 106 aids this counter-clockwise movement while springs 108, 108' are placed under compression. Upon reverse movement of the shaft 80, the tension of the spring 106 is overcome and the compressed springs 108, 108' help to lower the rake assembly. When the piston rod 66 is actuated to move in a direction to the right on Figure 4, with the aid of the spring 102, the arm 82, 82' will descend by virtue of the compression in the springs 108, 108', the latter being journalled about the rods 84, 84'. When the arms 82, 82' have fully descended to a predetermined position, the slidable latch 94 again engages the keeper 90 to hold the arm and of course the tool bar and rake blades in a given position.

Figure 6:
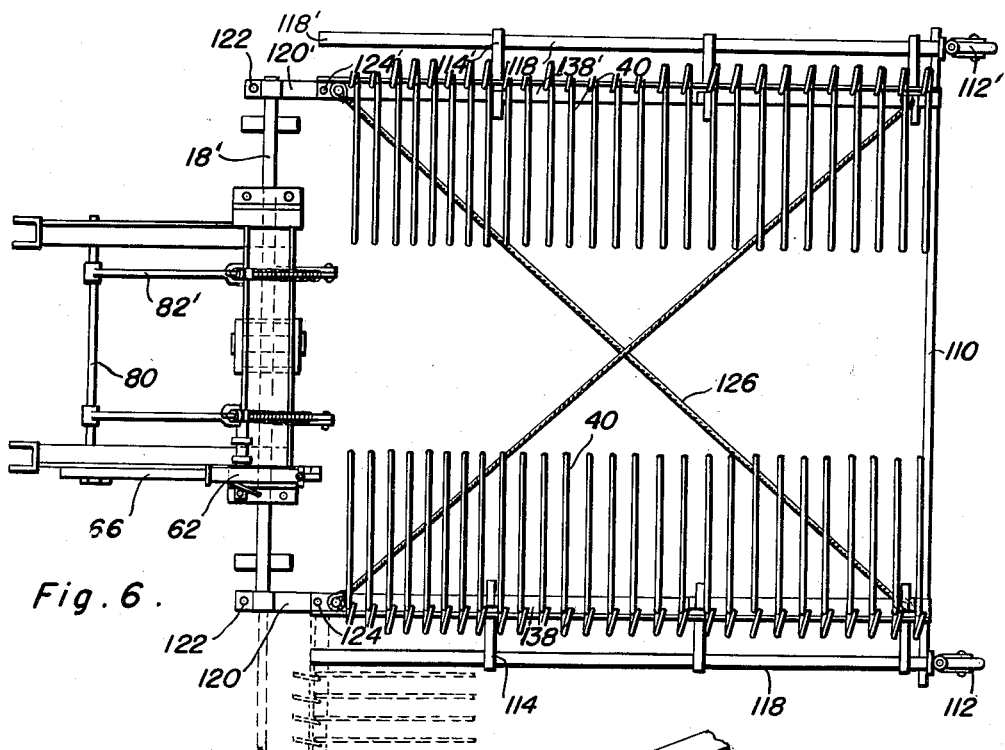
Figure 6 is a top plan view of a modified and larger raking device.

As shown in Figure 6 a modification of the dump rake shown in Figures 1 to 5 is provided which is larger than the first dump rake shown and which consists of a frame having a pair of spaced longitudinally extending tool bars 138, 138' interconnected at their rear end with a further frame member 110 the free extremities of which extend beyond the tool bars 138, 138' and carry conventional caster type wheels 112, 112'. Depending from the tool bars 138, 138' are a plurality of lugs 114, 114' which are in turn secured to a pair of offset longitudinally extending rods 118, 118'. It should be mentioned at this point that the main beam 18' is in effect a hollow cylinder the internal diameter of which is greater than the diameter of the rods 118.

A pair of clamps 120, 120' are provided which are slidable upon the main beam 18' and which can be adjustably tightened upon the beam 18' by means of externally threaded screws 122, 122'. It should be mentioned at this point that the clamps 120, 120' are conventional split clamps. To the rear end of the clamps 120, 120' the tool bars 138, 138' are pivoted by means of pivot pins 124, 124'. The tool bars are interconnected by means of crossed rods 126.

In the position shown in Figure 6 the dump rake is in transport position when it is desired to convert the dump rake from a transport position to an operative position, the rods 126 and the frame member 110 are disconnected from the dump rake frame, the screws 122, 122' are loosened, and the tool bars 138, 138' are horizontally pivoted so that the rods 118, 118' are in horizontal alignment with the main beam 18'. Thereafter, the rods 118, 118' are slid into the main beam 18 in telescoping fashion to the point where a continuous lateral rake is secured, whereupon the screws 122, 122' are tightened and the dump rake frame is thereby rigidly secured to the main beam 18.

Figure 7:
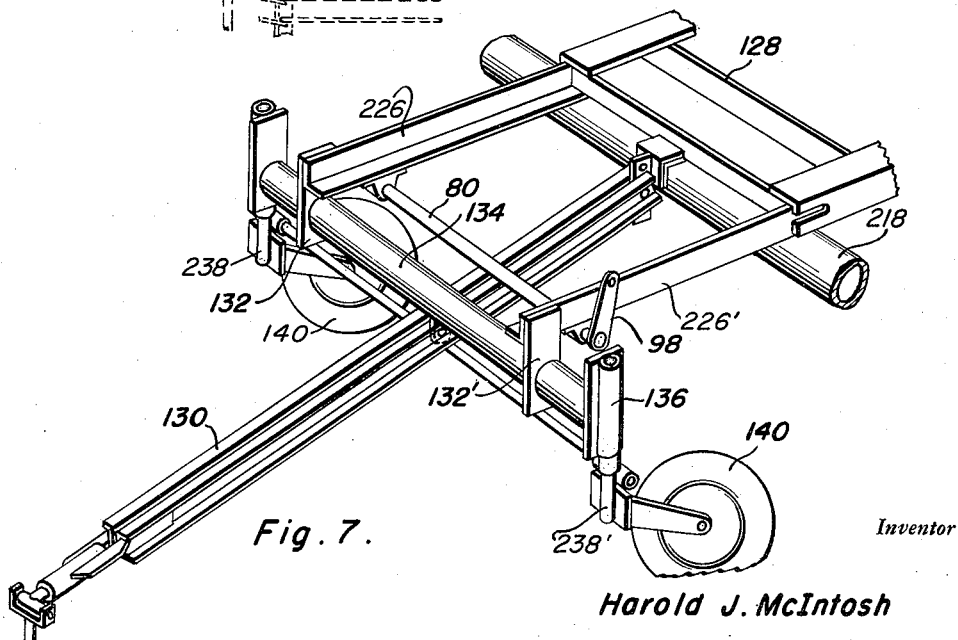
Figure 7 is a perspective view of a modified carriage for pivotally supporting the raking device on the prime mover or tractor.

Figure 7 depicts a modification of the carriage member 12 shown in Figures 1 through 5. This carriage consists essentially of a pair of spaced longitudinal side members 226, 226', preferably in the form of angle irons interconnected at their rear ends by means of a transverse member 128, preferably in the form of a channel. Pivotally secured to the member 218 is a longitudinally extending draw bar 130 which normally engages the axle or frame of a tractor. Secured to the side members 226, 226' by means of depending lugs 132, 132' is another transverse frame member 134 the ends of which carry vertically disposed sleeves 136 which slidably and swivelly engage the shank 238, 238' of a pair of caster wheels 140, 140'.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a tractor having a rake carriage secured thereto and a tool bar mounted for vertical pivotal movement on said carriage; a hydraulically operable means for raising and lowering said tool bar comprising a hydraulic cylinder mounted on said carriage, a piston rod slidable in said cylinder, a cam carried by said piston, an inclined lifting arm secured at one of its ends to said tool bar, means actuated by said cam for releasing said lifting arm, and means actuated by said piston rod for raising and lowering said lifting arm.

2. The combination of claim 1 wherein said locking and releasing means includes a slidable latch on said carriage, an upstanding lug at one end of said latch engaging said cam, and a keeper on said lifting arm for engageably receiving the other end of said latch.

3. The combination of claim 2 wherein said raising and lowering means includes a rotatable rod mounted on said carriage, the other end of said lifting arm being secured to said rod, and a link secured at one of its ends to said rotatable rod and pivoted at its other end to said piston rod in advance of said cam.

4. In a tractor having a rake carriage secured thereto and a tool bar mounted for vertical pivotal movement on said carriage; a hydraulically operable means for raising and lowering said tool bar comprising a hydraulic cylinder mounted on said carriage, a piston rod slidable in said cylinder, a cam carried by said piston rod, an inclined lifting arm secured at one of its ends to said tool bar, a latch bar slidably mounted on said carriage and including an upstanding lug at one end thereof engaging said cam, a keeper on said lifting arm engaging the other end of said latch bar, and means actuated by said piston rod for raising and lowering said lifting arm, said cam urging said latch bar out of engagement with said lug to release said lifting arm upon actuation of said last-named means to raise said lifting arm, said latch bar being manually movable to reengage said lug and lock said lifting arm when the latter is in its lowermost position.

5. The combination of claim 4 wherein said raising and lowering means includes a rotatable rod mounted on said carriage, the other end of said lifting arm being secured to said rod, and a link secured at one of its ends to said rotatable rod and pivoted at its other end to said piston rod in advance of said cam.

6. The combination of claim 5 wherein said piston rod carries a lug in advance of said cam and having an elongated slot therein, the other end of said link being pivotally engaged with said slotted lug through the slot therein, and a spring terminally secured to the piston rod adjacent said slotted lug and to said link, said spring normally urging said link towards that end of said piston rod opposite said cam.

HAROLD J. McINTOSH.

REFERENCES CITED

The following references are of record in the file of this patent:

UNITED STATES PATENTS

| Number | Name | Date |
| --- | --- | --- |
| 260,056 | Shields | June 27, 1882 |
| 783,636 | Harrold | Feb. 28, 1905 |
| 931,012 | Lamkin | Aug. 10, 1909 |
| 965,110 | Howe | July 19, 1910 |
| 1,525,580 | Gentry | Feb. 10, 1925 |
| 1,969,684 | Bird | Aug. 7, 1934 |
| 2,226,460 | Bristol et al. | Dec. 24, 1940 |
| 2,228,813 | Clendening | Jan. 14, 1941 |
| 2,366,234 | Blaydes | Jan. 2, 1945 |

FOREIGN PATENTS

| Number | Country | Date |
| --- | --- | --- |
| 47,374 | Denmark | May 17, 1933 |